UNITED STATES PATENT OFFICE.

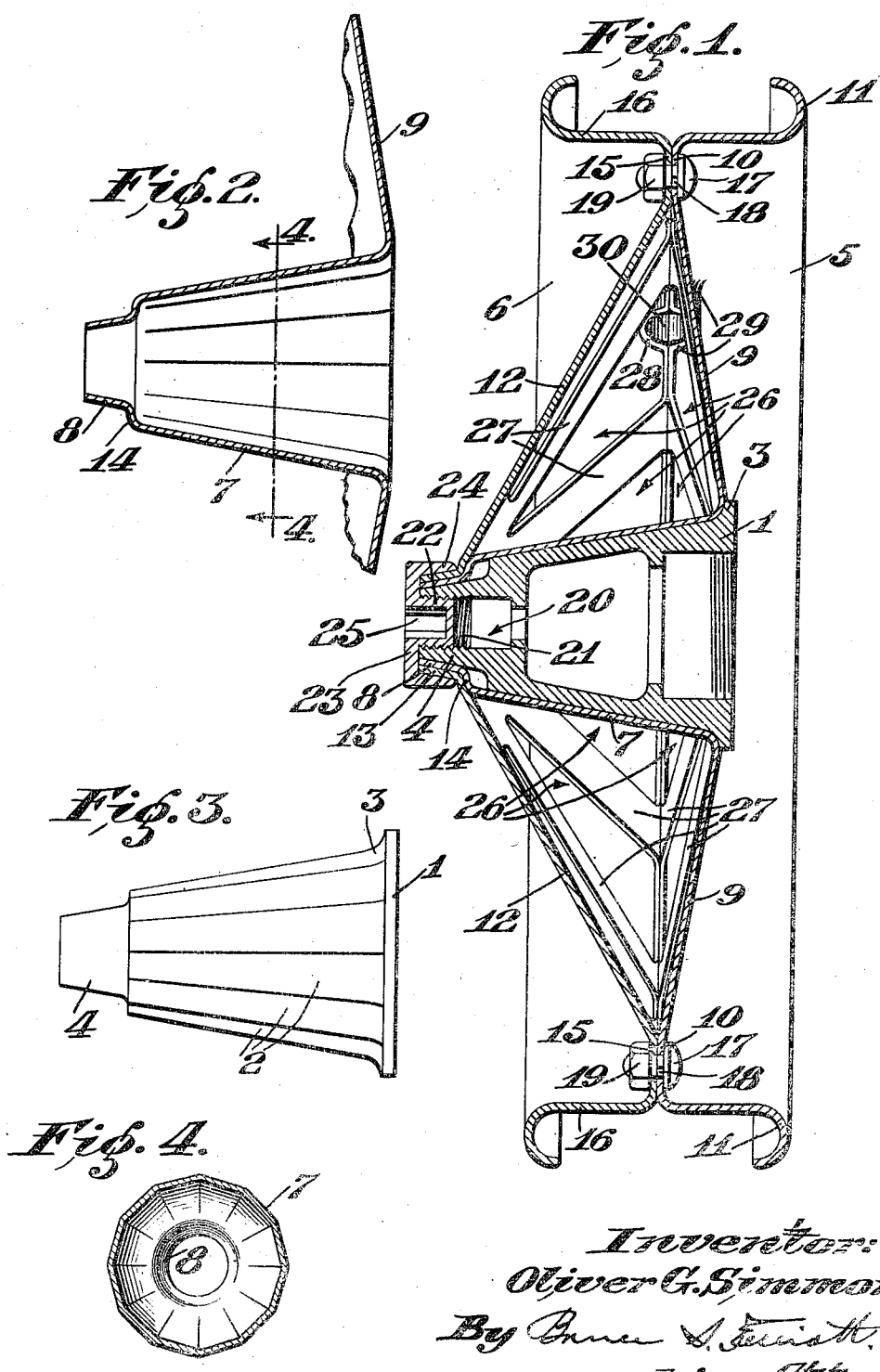

OLIVER G. SIMMONS, OF SAN ANTONIO, TEXAS, ASSIGNOR TO SIMMONS WHEEL COMPANY, OF SAN ANTONIO, TEXAS, A CORPORATION OF TEXAS.

DEMOUNTABLE WHEEL.

1,179,768.

Specification of Letters Patent. Patented Apr. 18, 1916.

Application filed May 13, 1915. Serial No. 27,733.

*To all whom it may concern:*

Be it known that I, OLIVER G. SIMMONS, a citizen of the United States, residing in San Antonio, in the county of Bexar and State of Texas, have invented new and useful Improvements in Demountable Wheels, of which the following is a specification.

This invention relates to wheels of the type adapted to carry a pneumatic tire, and has for its general object to provide a pressed steel wheel which shall be light in weight, simple and strong in construction, and which may be manufactured at relatively low cost.

A further object of the invention is to provide a wheel of this character which shall be readily demountable as a whole, and the construction of which also affords a quickly detachable rim portion.

A still further object of the invention is to provide a wheel having an inner non-circular hub member, preferably frusto-pyramidal in shape, surrounded by an outer hub member of the same shape and preferably formed integral with the wheel.

Other objects of the invention relate to details of construction and to constructions and combinations of parts, all of which will more clearly hereinafter appear.

The best embodiment of my invention now known to me is illustrated in the accompanying drawing, in which—

Figure 1 is a vertical sectional view of my improved wheel; Fig. 2 is a vertical fragmentary section thereof with the inner hub member and other parts removed; Fig. 3 is a view in side elevation of the inner hub member; and Fig. 4 is a section on the line 4—4 of Fig. 2.

Referring now to the drawing, the numeral 1 indicates the inner hub member which is adapted to be secured to any suitable form of axle or steering knuckle. The outer portion 2 of the inner hub member has the form of a frustum of a pyramid, the larger end of which is provided with a flared portion 3. Extending beyond the smaller end of this hub member is a reduced portion 4, which is frusto-conical in shape.

The wheel proper is formed in two integral parts, indicated, respectively, by the numerals 5 and 6, each of said parts being of pressed metal construction. The part 5 comprises a central drawn portion 7, constituting an outer hub member, the same being frusto-pyramidal in shape and snugly embracing the inner hub member 1, and having a reduced frusto-conical end portion 8 closely fitting on the end portion 4 of the inner hub member. Surrounding the larger end of the hub member 7, and projecting radially outward on an inward incline relative to the median line of the wheel is a web 9, the outer peripheral portion 10 of which is formed flat, or straight. From the outer extremity of this straight portion the metal extends outward at right angles, and is then curved upon itself to form one member 11 of the rim for receiving and clenching the tire. When the part 5 of the wheel is in position on the inner hub the flared end 3 of the latter abuts against the web 9 at the junction of the web with the hub member 7.

The part 6 of the wheel comprises a main portion or web 12, having a much greater incline than the web 9 and is provided at its center with a hub end 13 of frusto-conical shape snugly fitting over the similarly-shaped end portion 8 of the outer hub 7, and abutting against a shoulder member 14 provided at the base of said end portion. The peripheral portion of the web 12 is formed flat, or straight, as indicated at 15, and from the extremity of this straight portion the metal is drawn to form a rim member 16 complemental to the member 11. The flat portions 10 and 15 of the respective webs 9 and 12 provide contact faces for the two parts 5 and 6 of the wheel, and at suitable intervals around the wheel bolts 17 are passed through these engaging portions of the two webs, each of said bolts having a portion of its shank adjacent to its head formed square, as indicated at 18, and fitting in a squared aperture in the flat portion 10. The remaining portion of the shank is circular and screw-threaded, and has a nut 19 applied thereto. When the nuts 19 are screwed home against the flat portion 15 the two halves of the rim are securely held together independently of the securing means provided at the center of the wheel to be later described. In screwing up or unscrewing the nuts 19, the engagement of the squared portion 18 of each bolt in its aperture prevents the bolts 17 from turning.

The smaller end portion of the inner hub member 1 is bored to provide a cylindrical recess 20 for the reception of roller-bearings (not shown), the outer end of said recess being threaded, as indicated at 21, to receive the threaded extension 22 of a nut 23. Said nut is provided with an annular conical flange 24 which fits snugly over the hub end 13 of the web 12. The said nut is also provided with a hexagonal aperture 25 for the reception of a wrench.

It will be apparent that the wheel as a whole may be easily removed from the inner hub member, for the purpose of repair, or otherwise, by simply removing the nut 23, and that the same wheel, or another similar wheel, can as easily be replaced. It will also be apparent that the part 6 of the wheel may be removed from the part 5 by removing nut 23 and nuts 19, thus permitting the quick detaching of the tire as well as of the wheel.

While the webs 9 and 12 may be imperforate, I have shown them as being pierced or cut out at 26 to form spokes 27. This is desirable in the interest of lightness of construction.

The flat peripheral portions 10, 15, of the webs 9 and 12 are formed with corresponding semi-cylindrical members 28, 29, located within corresponding cut out spaces 26, which members, when the two parts of the wheel are connected together, form an opening 30 for the valve stem of the tire.

It will be understood that the relative sizes and proportions of parts, as well as the general design, may be varied without departing from the spirit of my invention.

I claim:

1. A wheel of the class described, comprising an inner hub member and a wheel section formed in two integral parts providing central engaging members and complemental rim sections, and one of said parts providing an outer hub member surrounding said inner hub member, and independent means for detachably connecting together the two rim sections and the said engaging members with said inner hub member, respectively.

2. A wheel of the class described, comprising an inner hub member and a wheel section formed in two parts, one of said parts comprising a rim section and an outer hub member connected thereto and surrounding said inner hub member, and the other part comprising a rim section and a hub end connected thereto and surrounding the said outer hub member, detachable means for engaging said inner hub member and embracing the hub end of said second part, and means for connecting together the two rim sections.

3. A wheel of the class described, comprising an inner non-circular hub member and a wheel section formed in two parts, one of said parts comprising a rim section and an outer hub member connected thereto and of the same shape as, and surrounding, said inner hub member, and the other part comprising a rim section and a hub end connected thereto and surrounding the said outer hub member, detachable means for engaging said inner hub member and embracing the hub end of said second part, and means for connecting together the two rim sections.

4. A wheel of the class described, comprising an inner hub member and a wheel section formed in two parts, one of said parts comprising a rim section and an outer hub member connected thereto and surrounding said inner hub member, and the other part comprising a rim section and a hub end connected thereto and surrounding the said outer hub member, detachable means for engaging said inner hub member and embracing the hub end of said second part, and detachable means for connecting together the two rim sections.

5. A wheel of the class described, comprising an inner hub member having a reduced end portion and a wheel section formed in two parts, one of said parts comprising a rim section and an outer hub member connected thereto and embracing said inner hub member and having a hub end surrounding the reduced end portion of the inner hub member, and the other part comprising a rim section and a hub end connected thereto and surrounding the hub end of said outer hub member, detachable means for engaging said inner hub member and embracing the hub end of said second part, and means for connecting together the two rim sections.

6. A wheel of the class described, comprising an inner non-circular hub member having a conoidal reduced end portion, and a wheel section formed in two parts, one of said parts comprising a rim section and an outer hub member connected thereto and of the same shape as, and surrounding, said inner hub member and having a conoidal extension surrounding the said conoidal end portion of the inner hub member, and the other part comprising a rim section and a conoidal hub end connected thereto and surrounding the conoidal extension of said outer hub member, a nut for engaging said inner hub member and having an annular flange embracing the hub end of said second part, and means for connecting together the two rim sections.

7. A wheel of the class described, comprising an inner frusto-pyramidal hub member having a conoidal extension at its smaller end provided with a screw-threaded aperture, and a wheel section formed in two parts, one of said parts comprising a rim section and an outer hub member connected thereto and of the same shape as, and surrounding, said inner hub member and having a conoidal extension surrounding the extension of said inner hub member, and the other part comprising a rim section and a conodial hub end connected thereto and surrounding the extension of said outer hub member, a nut having a screw-threaded extension engaging in the aperture of the inner hub member and provided with an annular flange snugly embracing the extension of said second part, and means for connecting together the two rim sections.

8. A wheel of the class described, comprising an inner hub member and a wheel section formed in two integral parts, one of said parts comprising a rim section, a body portion or web, and an outer hub member surrounding said inner hub member, and the other part comprising a rim section, a body portion or web, and a hub end surrounding the said outer hub member, detachable means for engaging said inner hub member and embracing the hub end of said second part, and means for connecting together the two rim sections.

9. A wheel of the class described, comprising a wheel section formed in two integral parts providing complemental rim sections, one of said parts having a web provided with a central annular extension, and the other of said parts having a web providing a non-circular outer hub member and an annular reduced extension projecting beyond the same and into the extension of the first-named web, an inner hub member of the same shape as, and inserted in, said outer hub member and having a flared end portion engaging the web of said second part and a reduced end portion entering the extension of said outer hub member and provided with a screw-threaded aperture, a nut having a threaded extension engaging in said aperture and provided with an annular flange embracing the extension of said first-named web, and means for detachably connecting together said rim sections.

10. A wheel of the class described, comprising an inner hub member and a wheel section formed in two integral parts providing central conoidal telescoping members and complemental rim sections, and one of said parts providing an outer hub member detachably, but non-rotatably, surrounding and engaging said inner hub member and carrying the innermost of said telescoping members, and independent means for detachably connecting together the two rim sections and the said telescoping members with said inner hub member, respectively.

11. A wheel of the class described comprising a wheel section formed in two integral peripherally converging parts providing complemental rim sections affording a tire seat, one of said parts providing an outer hub member having a hub end projecting therefrom, and the other part providing a hub end embracing the hub end of the first-named part.

12. A wheel of the class described, comprising a wheel section formed in two peripherally converging parts, each of which carries a rim section forming a part of the tire seat, one of said parts providing a hub member having a hub end projecting therefrom, and the other part providing a hub end embracing the hub end of the first-end named part, and means for securing the two hub ends together.

13. A wheel of the class described, comprising a wheel section formed in two integral peripherally converging parts providing rim sections affording a tire seat one of said parts providing a hub member having a hub end projecting therefrom, and the other part providing a hub end embracing the hub end of the first-named part, and means for securing the two hub ends together.

14. A pressed-metal wheel comprising two integral peripherally-converging parts constituting opposite side members of the wheel, each part consisting of a rim section forming a part of a tire seat, a hub member, and a connecting web section, said hub members having end portions detachably associated at one side of the wheel.

15. A pressed-metal wheel comprising two integral parts constituting opposite side members of the wheel, each part consisting of a rim section forming a part of a tire seat, a hub member, and a connecting web section, said web sections having circumferential contact with each other and being disposed at angles to the axis, the one of which is greater than the other, and said hub members having end portions detachably associated at one side of the wheel.

In testimony whereof, I have hereunto set my hand.

OLIVER G. SIMMONS.